United States Patent
Overton

(10) Patent No.: US 7,567,810 B1
(45) Date of Patent: Jul. 28, 2009

(54) METHOD AND SYSTEM FOR DELIVERING DATA BASED ON CONTEXT

(75) Inventor: Jerry A. Overton, Lees Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 407 days.

(21) Appl. No.: 10/675,145

(22) Filed: Sep. 30, 2003

(51) Int. Cl.
*H04W 24/00* (2006.01)

(52) U.S. Cl. ............... 455/456.3; 455/414.1; 455/412.1; 370/328; 370/338

(58) Field of Classification Search ............. 455/456.1, 455/456.2, 456.3, 412.1, 414.1, 414.2, 414.3; 370/328, 338
See application file for complete search history.

(56) References Cited

U.S. PATENT DOCUMENTS

| | | | |
|---|---|---|---|
| 5,546,445 A * | 8/1996 | Dennison et al. ............. 455/408 |
| 5,711,008 A * | 1/1998 | Gallant et al. ................ 455/466 |
| 5,732,326 A * | 3/1998 | Maruyama et al. ......... 455/66.1 |
| 6,396,537 B1 | 5/2002 | Squilla et al. |
| 6,625,447 B1 * | 9/2003 | Rossmann ............... 455/426.1 |
| 6,798,358 B2 * | 9/2004 | Joyce et al. ............. 340/995.24 |
| 6,912,398 B1 | 6/2005 | Domnitz |
| 6,922,720 B2 * | 7/2005 | Cianciarulo et al. ......... 709/217 |
| 6,944,479 B2 * | 9/2005 | Andaker et al. ............. 455/560 |
| 6,970,548 B2 * | 11/2005 | Pines et al. ............ 379/218.01 |
| 2003/0060211 A1 * | 3/2003 | Chern et al. ................. 455/456 |
| 2003/0100312 A1 * | 5/2003 | Takahashi ................... 455/453 |
| 2006/0085755 A1 * | 4/2006 | Arai ........................... 715/764 |

OTHER PUBLICATIONS

Roger Gimson, "Delivery Context Overview for Device Independence", W3C Working Draft, Dec. 13, 2002.
Hjelm et al., "WAP NG and iMode 2: Convergence effects on services", Japan, printed from the Internet on Jun. 3, 2003.
Wesley Chan, "Collaborative, Mobile, Guides: Possible Scenarios", Project Voyager at the MIT Laboratory, Oct. 25, 2000.

* cited by examiner

*Primary Examiner*—Nghi H Ly

(57) ABSTRACT

The method and system provides for sending data in response to a request from a device, wherein the data sent is based on the location and capabilities of the requesting device. In exemplary embodiments, an entity, such as a network server, can receive a request from the device, determine a location and one or more capabilities of the device, acquire context-based information based on the location and capabilities of the device, and send that information to the requesting device. The network server or other entity might also maintain a set of data that correlates data-references, which might point to respective data, with location and device capability information. The network server or other entity might then, in response to a request for context-based information, query the set of data to uncover at least one data-reference that the set of data correlates with the location and one or more capabilities of the device.

18 Claims, 6 Drawing Sheets

| Device Location | Data Reference | Data Size | Data Provider | Device Requirement |
|---|---|---|---|---|
| $(x+1)^2 + (y+1)^2 + (z+1)^2 = 1$ | www.provider1.com/picture1.gif | 1MB | provider1 | must have 16 MB memory |
| $(x+1)^2 + (y+1)^2 + (z+1)^2 = 1$ | www.provider2.com/picture1.gif | 1MB | provider2 | must have color screen |
| $(x+1)^2 + (y+1)^2 + (z+1)^2 = 1$ | www.provider2.com/picture2.gif | 2MB | provider2 | must have 16 MB memory |
| $(x+1)^2 + (y+1)^2 + (z+1)^2 = 1$ | www.provider2.com/picture1.gif | 1MB | provider2 | must have 16 MB memory |
| $(x+1)^2 + (y+1)^2 + (z+1)^2 = 1$ | www.provider2.com/picture2.gif | 2MB | provider2 | must have color screen |
| $(x+1)^2 + (y+1)^2 + (z+1)^2 = 1$ | www.provider1.com/picture1.gif | 1MB | provider1 | must have color screen |
| $(x+1)^2 + (y+1)^2 + (z+1)^2 = 1$ | www.provider1.com/picture2.gif | 2 MB | provider1 | must have 16 MB memory |
| $(x+1)^2 + (y+1)^2 + (z+1)^2 = 1$ | www.provider1.com/picture2.gif | 2 MB | provider1 | must have color screen |
| $(x+1)^2 + (y+1)^2 + (z+1)^2 = 4$ | www.provider1.com/picture1.gif | 1MB | provider1 | must have 16 MB memory |
| $(x+1)^2 + (y+1)^2 + (z+1)^2 = 4$ | www.provider1.com/picture1.gif | 2 MB | provider1 | must have color screen |
| $(x+1)^2 + (y+1)^2 + (z+1)^2 = 4$ | www.provider1.com/picture1.gif | 1MB | provider1 | must have color screen |
| $(x+1)^2 + (y+1)^2 + (z+1)^2 = 4$ | www.provider2.com/picture2.gif | 2MB | provider2 | must have 16 MB memory |
| $(x+1)^2 + (y+1)^2 + (z+1)^2 = 4$ | www.provider1.com/picture2.gif | 2 MB | provider1 | must have 16 MB memory |
| $(x+1)^2 + (y+1)^2 + (z+1)^2 = 4$ | www.provider2.com/picture2.gif | 1MB | provider2 | must have color screen |
| $(x+1)^2 + (y+1)^2 + (z+1)^2 = 4$ | www.provider2.com/picture1.gif | 1MB | provider2 | must have 16 MB memory |
| $(x+1)^2 + (y+1)^2 + (z+1)^2 = 4$ | www.provider2.com/picture2.gif | 2MB | provider2 | must have color screen |

| Data Reference | Data Size | Data Provider |
|---|---|---|
| www.provider1.com/picture1.gif | 1MB | provider1 |
| www.provider1.com/picture2.gif | 2 MB | provider1 |
| www.provider2.com/picture1.gif | 1MB | provider2 |
| www.provider2.com/picture2.gif | 2MB | provider2 |

Figure 5

| Device Requirement |
|---|
| must have 16 MB memory |
| must have color screen |

Figure 6

| Device Location |
|---|
| $(x+1)^2 + (y+1)^2 + (z+1)^2 = 1$ |
| $(x+1)^2 + (y+1)^2 + (z+1)^2 = 4$ |

Figure 7

| Device Location | Data Reference | Data Size | Data Provider | Device Requirement |
|---|---|---|---|---|
| (x+1)^2 + (y+1)^2 + (z+1)^2 = 1 | www.provider1.com/picture1.gif | 1MB | provider1 | must have 16 MB memory |
| (x+1)^2 + (y+1)^2 + (z+1)^2 = 1 | www.provider2.com/picture1.gif | 1MB | provider2 | must have color screen |
| (x+1)^2 + (y+1)^2 + (z+1)^2 = 1 | www.provider2.com/picture2.gif | 2MB | provider2 | must have 16 MB memory |
| (x+1)^2 + (y+1)^2 + (z+1)^2 = 1 | www.provider2.com/picture1.gif | 1MB | provider2 | must have 16 MB memory |
| (x+1)^2 + (y+1)^2 + (z+1)^2 = 1 | www.provider2.com/picture2.gif | 2MB | provider2 | must have color screen |
| (x+1)^2 + (y+1)^2 + (z+1)^2 = 1 | www.provider1.com/picture1.gif | 1MB | provider1 | must have 16 MB memory |
| (x+1)^2 + (y+1)^2 + (z+1)^2 = 1 | www.provider1.com/picture2.gif | 2 MB | provider1 | must have color screen |
| (x+1)^2 + (y+1)^2 + (z+1)^2 = 1 | www.provider1.com/picture1.gif | 1MB | provider1 | must have 16 MB memory |
| (x+1)^2 + (y+1)^2 + (z+1)^2 = 4 | www.provider1.com/picture2.gif | 2 MB | provider1 | must have color screen |
| (x+1)^2 + (y+1)^2 + (z+1)^2 = 4 | www.provider1.com/picture1.gif | 1MB | provider1 | must have 16 MB memory |
| (x+1)^2 + (y+1)^2 + (z+1)^2 = 4 | www.provider2.com/picture2.gif | 2MB | provider2 | must have 16 MB memory |
| (x+1)^2 + (y+1)^2 + (z+1)^2 = 4 | www.provider2.com/picture1.gif | 1MB | provider2 | must have color screen |
| (x+1)^2 + (y+1)^2 + (z+1)^2 = 4 | www.provider2.com/picture1.gif | 1MB | provider2 | must have 16 MB memory |
| (x+1)^2 + (y+1)^2 + (z+1)^2 = 4 | www.provider2.com/picture2.gif | 2MB | provider2 | must have color screen |

Figure 8

| Location | Data Reference | Data Size | Data Provider | Device Requirement |
|---|---|---|---|---|
| (x+1)^2 + (y+1)^2 + (z+1)^2 = 1 | www.provider1.com/picture1.gif | 1MB | provider1 | must have color screen |
| (x+1)^2 + (y+1)^2 + (z+1)^2 = 1 | www.provider1.com/picture1.gif | 1MB | provider1 | must have 16 MB memory |
| (x+1)^2 + (y+1)^2 + (z+1)^2 = 1 | www.provider1.com/picture2.gif | 2 MB | provider1 | must have color screen |
| (x+1)^2 + (y+1)^2 + (z+1)^2 = 1 | www.provider1.com/picture2.gif | 2 MB | provider1 | must have 16 MB memory |

Figure 9

METHOD AND SYSTEM FOR DELIVERING DATA BASED ON CONTEXT

BACKGROUND

1. Field of the Invention

The present invention provides a method and system for delivering data to a requesting device, based on the location and capabilities of the device.

2. Background

Location-based services can comprise services that can act according to a location of a user and can include, for example, the delivery of information, routing of calls, or billing of subscribers. The services might fall under different categories, such as, for example, emergency ("E911"); crisis (for example, roadside assistance, nearest hospital, service station, etc.); hazards or advisories (for example, road conditions such as traffic, construction, earthquake, mudslide, etc.; weather alerts; environmental alerts such as smog alerts; etc.); convenience (for example, nearest hotel, restaurant reservations, entertainment); informational (for example, local sports or news); games; and promotional (for example, sales, coupons, advertisements, etc.). Various service or content providers, such as weather services, concierge services, or telecommunications service providers ("carriers"), for example, might provide location-based information or content (hereinafter sometimes collectively referred to as "data," "information," or "content").

Users, in turn, can request and receive the location-based information or content on various devices, or client stations (such as cellular telephones, pagers, or appropriately equipped portable computers, for instance). Client stations that receive location-based information or content might have different capabilities, however. For instance, some client stations might only be able to receive data or files less than a given size, some client stations might not have color display screens, and some client stations might only have a limited amount of memory (such as random access memory ("RAM"), for instance).

Thus, there is a need to provide context-based services, which can comprise services that can act according to both the location and capabilities of a particular client station.

SUMMARY

According to an exemplary embodiment of the invention, a content provider (e.g., a carrier or third party provider) will correlate references to data with the location and capabilities of a device to which the content will be delivered. The content provider will then receive from a device a request for data and will responsively search through the indexed data-references to uncover one or more data references that match the device's current location and capabilities. The content provider will then acquire the data to which the uncovered data references point, and the content provider will send the acquired data to the requesting device in response to the request.

By way of example, a carrier could maintain in a database a list of uniform resource locators ("URLs") (or, more generally, uniform resource indicators ("URIs")), each pointing to particular data (e.g., a Web page, deck or directory, or media such as music, video or a game). For each URL, the database could indicate a geographic area (e.g., defined by geographic coordinates) for which the data is relevant, as well as device capabilities required for suitably presenting the data to a user (e.g., if the data requires color presentation, a color display screen could be a device capability).

A user operating a client station or other device could then send to the carrier an HTTP request carrying a "context URL," i.e., a special URL that the carrier understands to be a request for context-based data. In response, the carrier could then determine the location of the client station and the device capabilities of the client station.

The determination process could involve (i) receiving the request for context-based information within the HTTP request, such as within a header, and/or (ii) querying an applicable data store or determination system. In this regard, the location can take various forms and can be provided to varying degrees of granularity. Further, the device capability information could range from make/model number (which inherently defines certain capabilities) to recitations of specific operational characteristics.

The carrier could then query the database to find the URLs that match the client station's location and device capabilities. And the carrier could then acquire data from each uncovered URL, such as by sending an HTTP request directed to each URL. Further, the carrier could compile the acquired data in a portal page or other form. And the carrier could send the acquired data (e.g., portal page) in an HTTP response to the requesting client station.

Advantageously, by indexing references to data with location and device capability information, instead of indexing or tagging the data itself with location and device capability information, the exemplary embodiment can allow a content provider to deliver context-based data without the need to modify the data itself.

Other examples are possible as well.

BRIEF DESCRIPTION OF THE DRAWINGS

Exemplary embodiments of the present invention are described herein with reference to the drawings, in which:

FIG. 5 is a diagram depicting exemplary representations of data information in accordance with an exemplary embodiment of the present invention;

FIG. 6 is a diagram depicting exemplary representations of device requirement information in accordance with an exemplary embodiment of the present invention;

FIG. 7 is a diagram depicting exemplary representations of location information in accordance with an exemplary embodiment of the present invention;

FIG. 8 is a diagram depicting exemplary representations of data sets in accordance with an exemplary embodiment of the present invention; and FIG. 9 is a diagram depicting exemplary representations of a subset of data information in accordance with an exemplary embodiment of the present invention.

DETAILED DESCRIPTION OF EXEMPLARY EMBODIMENTS

1. Exemplary Architecture

Figure 1:
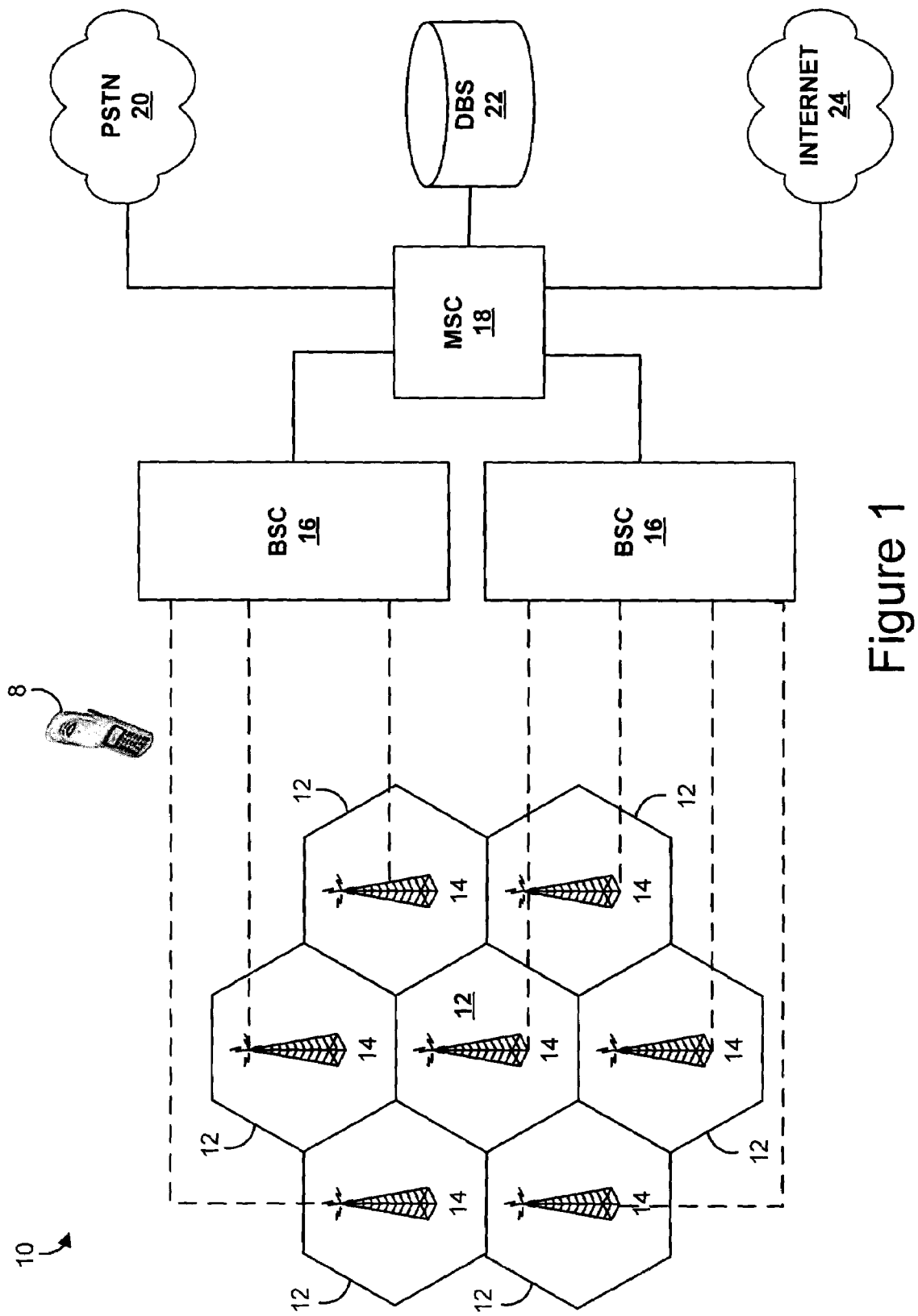
FIG. 1 is a block diagram illustrating components of an exemplary cellular radio communications system.

FIG. 1 is a block diagram illustrating components of a cellular radio communications system ("wireless telecommunications network") 10. In a typical wireless telecommunications network 10, an area is divided geographically into a number of cell sites 12. Each cell 12 can by defined by a radio frequency ("RF") radiation pattern from a respective base transceiver station ("BTS") 14 antenna, and each cell 12 can include one or more sectors (not shown). Each BTS 14 typically can transmit and receive wireless communications to and from a plurality of client stations 8.

Each BTS 14 might connect to a base station controller ("BSC") 16. As its name suggests, the BSC 16 can function to control communications via one or more BTSs 14. For instance, in some arrangements, a BSC might control the power level of signals emitted wirelessly by a BTS and might control the handoff of communications as a client station 8 moves between sectors within a BTS coverage area.

Each BSC 16 might then be coupled to a telecommunications switch or gateway, such as a mobile switching center ("MSC") 18 and/or a packet data serving node ("PDSN") (not shown), for instance. The switch or gateway might manage calls and might be coupled to one or more networks 24, such as the public switched telephone network ("PSTN") 20, the ANSI-41D SS7 Network, or another network such as the Internet or another IP or packet-switched network. The MSC 18 might also maintain one or more databases ("DBS") 22 that might store customer and system information. In an exemplary embodiment, the MSC might then authenticate and register client stations 8 on the telecommunications network 10 and process account information for customers.

When a client station 8 is positioned in a cell 12, the client station 8 might communicate via an RF air interface with the BTS 14 of the cell. Consequently, a communication path can be established between the client station 8 and the telecommunications network 10, via the air interface, the BTS 14, the BSC 16, and the switch or gateway (MSC 18, for example).

A client station 8 might communicate with the BTS 14 using any of a variety of different protocols. For instance, in a TDMA system, each BTS 14 typically communicates on a group of frequencies, and each frequency may itself carry at least one multiplexed call. In a CDMA system, by comparison, each BTS 14 communicates over a spread spectrum of frequencies, and the spectrum may carry many multiplexed calls. Typical components for CDMA systems include those described in the TIA standard, ANSI/TIA/EIA-95-B-99, dated Feb. 3, 1999, which is incorporated herein by reference in its entirety. The Global System for Mobile Communications ("GSM") or another method may also be used.

Figure 2:
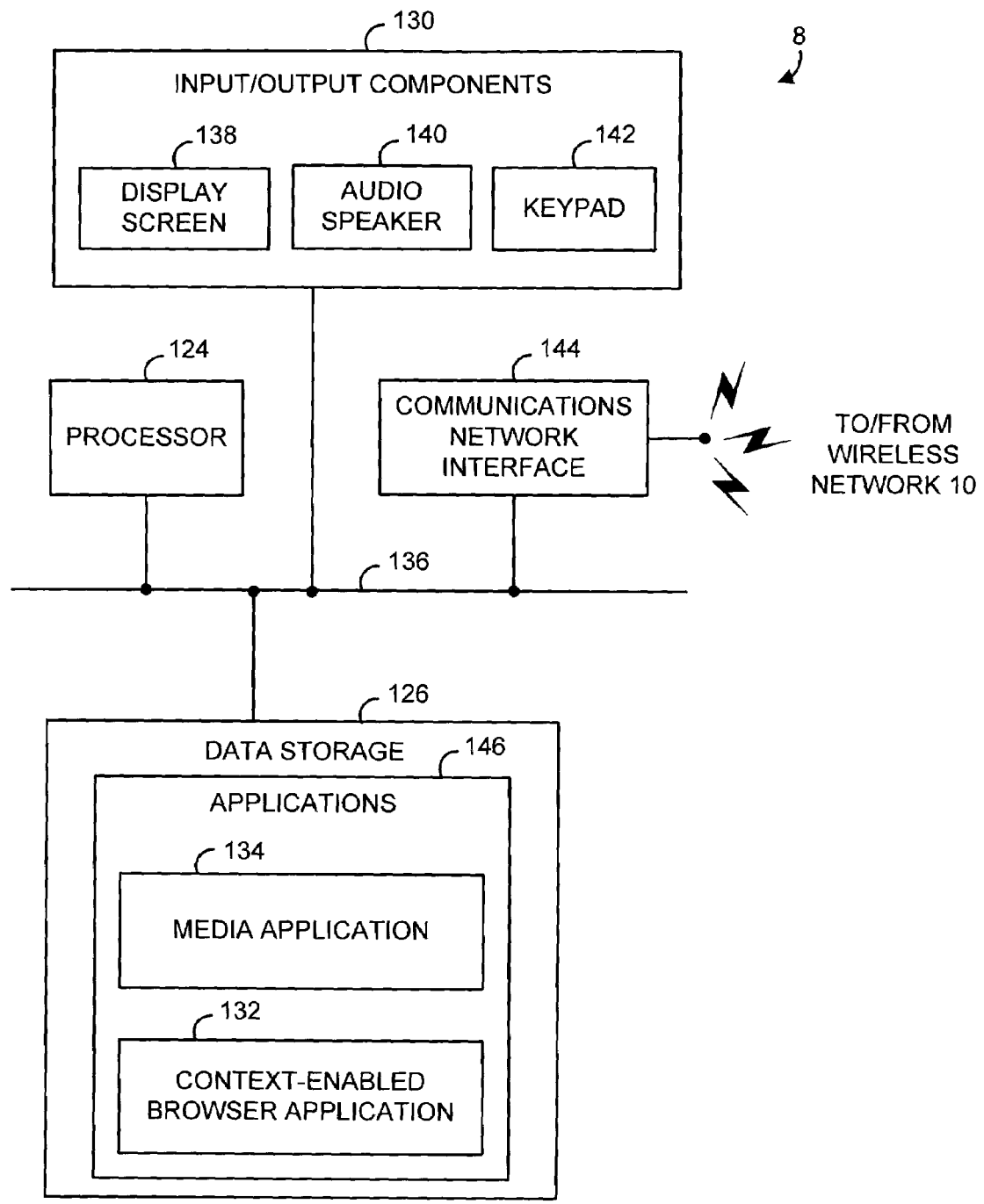
FIG. 2 is a block diagram illustrating exemplary components of a client station.

FIG. 2 is a block diagram showing some of the components of an exemplary client station 8. An exemplary client station 8 might include a processor 124, data storage 126, and machine language instructions stored in the data storage 126 and executable by the processor 124 to perform various functions described herein. The machine language instructions might define applications 162 that might also be stored in the data storage 126. The client station 8 might also comprise a wireless network interface component 144 through which the client station 8 can communicate with a wireless telecommunications network 10. Further, the client station 8 might comprise input and output components 130. The various components of the client station 8 (including the processor 124, the data storage 126, the wireless network interface 144, and the input and output components 130) might be coupled together directly or via a system bus 136, for instance. Other arrangements are possible as well.

As shown by way of example in FIG. 2, the input and output components 130 might comprise a display screen 138, an audio speaker 140, and a keypad 142. The client station 8 might also comprise other or additional input and/or output components, and the client station 8 might also have fewer input and/or output components than those shown in FIG. 2. In an exemplary embodiment, the client station 8 might have multimedia capabilities such as an ability to display video and play audio. In other embodiments, however, the client station 8 might not have multimedia capabilities, or the client station 8 might be capable of only playing audio or of only displaying video, or it might be limited in some other way, such as by not having a color display screen 138 or an audio speaker 140.

Applications 146 might be stored in the data storage 126 and executed by the processor 124. In an exemplary embodiment and as shown in FIG. 2, the data storage 126 might contain one or more media applications 134 and a context-enabled browser application 132. The applications 146 might utilize the various input and output components 130 of the client station 8 and, thereby, interact with the user. For example, one or more applications might output video on the display screen 138, play audio on the speaker 140, receive input from the keypad 142, or perform a combination of these or other actions.

The media application 134 might be suitable to present media content that various service providers might send to the client station 8. The media application 134 might be an industry standard MP3 audio and/or MPEG video player, or other such players supporting media encoding now known or later developed. A client station 8 might support more than one media application, and a user may add or remove media applications from the client station 8.

The context-enabled browser application 132 might be an application suitable for requesting and receiving context-based content. In an exemplary embodiment, the context-enabled browser application 132 might be a typical Web browser or an enhancement of a typical Web browser. Other examples are also possible.

Figure 3:
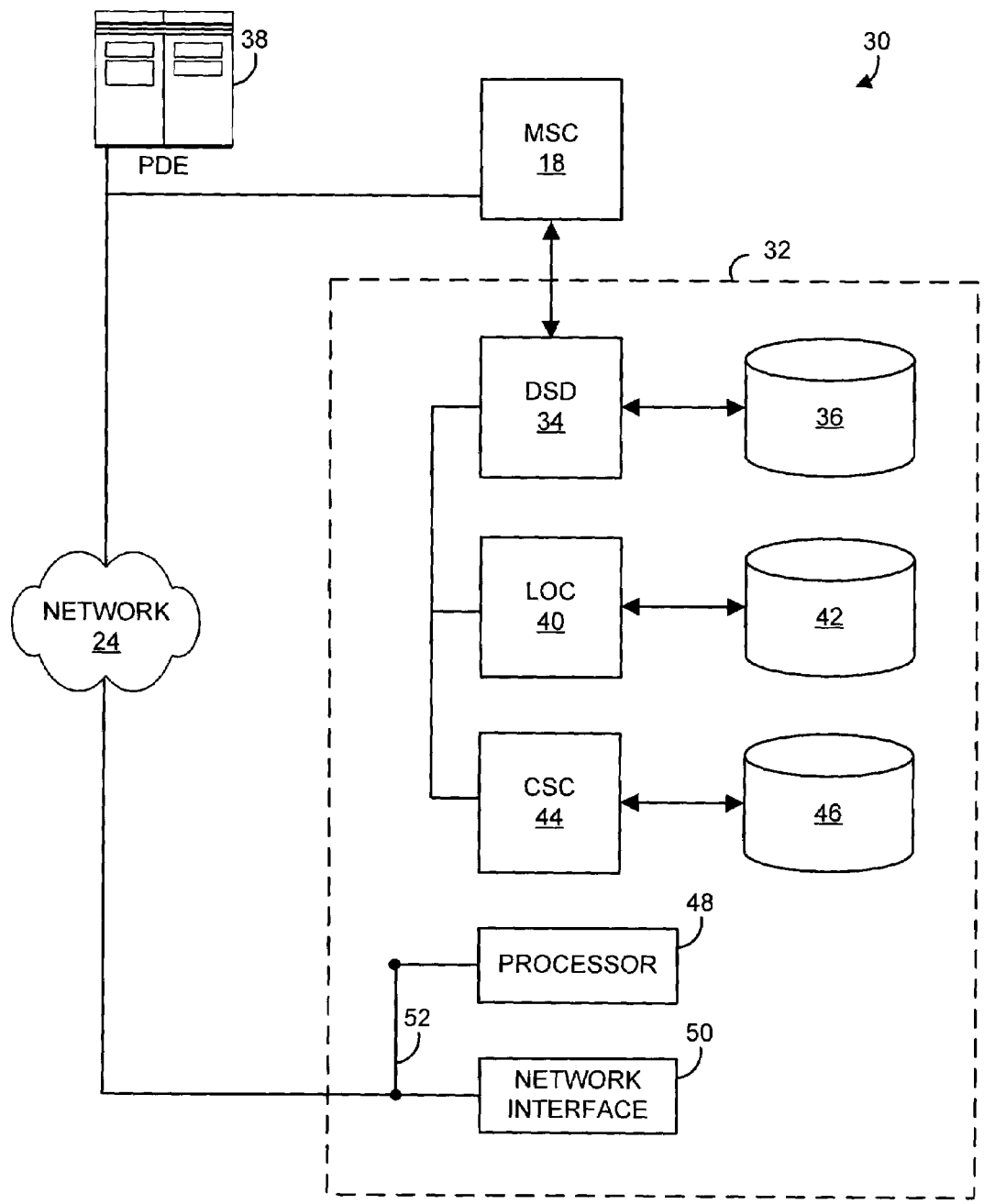
FIG. 3 is a block diagram illustrating exemplary position determining components for context-based services in an exemplary cellular radio communications system.

FIG. 3 depicts a location system comprising exemplary position determining components 30 that might be used to provide context-based services in the exemplary wireless telecommunications network 10 of FIG. 1. In an exemplary embodiment, the location system functions to determine and/or report the location of subscriber terminals, such as client stations 8. As such, the location system and position determining components could take a variety of forms. For example, the position determining components 30 might include position determining equipment ("PDE") 38 and a mobile positioning center ("MPC") 32 as defined by industry standard TIA/EIA IS-801.

The PDE 38 can be any system for determining the location of one or more client stations 8. As an example, the PDE 38 might comprise a network-based location determination system, such as a home location register ("HLR") that can maintain a record of the cell and sector in which each client station 8 is operating. As another example, the PDE 38 might comprise a triangularization system that can determine where a client station 8 is located based on a comparison of relative signal strengths from several measuring points. Alternatively or additionally, the PDE 38 might comprise a client station-based (or, more generally, subscriber-based) position determining system, such as a GPS receiver in a client station 8, as well as functionality to communicate that location information from the client station 8 to the network. In another embodiment, the PDE 38 might be integrated with one or more BTSs 14 of the wireless telecommunications network 10 and might also include other radio-frequency processing or collating devices for providing the geographical coordinates of one or more client stations 8 to the MPC 32. Many other examples are also possible.

The PDE 38 might determine the position of a client station 8 by a variety of methods. For example, the PDE 38 might instruct a particular client station 8 to activate a GPS receiver associated with the client station 8 and to relay the coordinates of the client station 8 to the PDE 38. In another example, the PDE 38 might instruct the client station 8 to measure the relative signal strengths of three or more BTSs 14, and the relative signal strengths might then provide a basis for a calculation of the location. In yet another example, the PDE 38 might instruct three or more BTSs 14 to measure the signal strength of the client station 8, and the PDE 38 might then calculate the position of the client station based on the measurements. Additional methods for measuring position might also include a time difference of arrival ("TDOA") method or an angle of arrival ("AOA") method. Other examples are possible as well.

In an exemplary embodiment, the location of a client station 8 can be identified by location coordinates according to the World Geodetic System 1984 (WGS-84) standards for geodetic reference. The PDE 38 might update the location of a client station once a user changes the location of the client station, or the PDE 38 might update the location of a client station only in response to other entities querying the PDE 38 for the location of the client station. Other examples are possible as well.

The MPC 32 can generally be a database application executed on a service control point and can function to store the location of one or more client stations 8. In an exemplary embodiment, the MPC 32 can maintain a record of the location of each client station 8, as determined by the PDE 38. In an exemplary embodiment, the MPC 32 might communicate with other entities of the wireless telecommunications network 10, such as the MSC 18, either directly or through the network 24. In turn, one or more entities can query the MPC 32 to determine the location of a given client station 8, and the MPC 32 can report the requested location.

In an exemplary embodiment, the MSC 18 might receive from a client station 8 a request for context-based information. The MSC 18 might then transmit that request to the MPC 32, which might then process that request, retrieve context-based information (by contacting a service provider, for example), and provide the context-based information to the MSC 18 for forwarding to the requesting client station 8.

Functional elements within the MPC 32 might include a data space directory server ("DSD") 34 with an associated DSD database 36, a location manager ("LOC") 40 with an associated LOC database 42, and a client station capabilities manager ("CSC") 44 with an associated CSC database 46. The functional elements within the MPC 32 might be in the form of separate computing devices, such as servers or computers, in the form of separate but interacting computer programs running on a single server or computer, or in any of a number of other configurations.

In an exemplary embodiment, an operating environment for the MPC 32 and associated devices can include a processing system with at least one processor 48 and a memory system. One or more processors 48 might then control the operations of the MPC 32 and might also instruct the memory system of the MPC 32 to read or write data to or from the databases 36, 42, and/or 46, for example.

The MPC 32 might also comprise one or more network interface components 50 through which the MPC 32 might communicate with the network 24 and/or with the MSC 18 or with other switches or gateways. The various components of the MPC (including the processor 48 and the network interface 50) might be coupled together directly or via a system bus 52, for instance. Other arrangements are possible as well.

In the exemplary embodiment depicted in FIG. 3, the functional elements within the MPC 32 might participate in the provision of context-based information to one or more client stations 8. For example, the DSD 34 might install, run, and maintain context-based service applications and provide those applications to a client station 8. The DSD 34 might also interact with other entities within or outside of the network 24 to obtain content for the service applications, for instance. Other examples and configurations are possible as well.

The LOC 40 might coordinate the operations of the PDE 38 and maintain a database 42 that comprises unique client station identifications (such as network access identifiers ("NAIs")) correlated with location information of particular client stations. In an exemplary embodiment, the LOC 40 can receive positional data from the PDE 38 and can use the data to form a determination of a client station's position. In operation, the LOC 40 might query the PDE 38 to determine the position of a particular client station 8 (for instance, a client station 8 that has requested context-based information). In an alternative embodiment, the client station 8 can include GPS equipment for determining the GPS coordinates of the client station 8. When the client station 8 requests context-based information, it might then make a GPS measurement and relay its GPS coordinates to the LOC 40 through the MSC 18. In any case, the LOC database 42 might then store location information of particular client stations. Other examples and configurations are possible as well.

The CSC 44 might maintain a database that comprises unique client station identifications (such as NAIs) correlated with information on the capabilities of particular client stations. In an exemplary embodiment, the capabilities of a client station 8 might include the capabilities of any input/output components 130 and/or any media applications 134 of the client station 8. Other examples and configurations are possible as well.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, those skilled in the art will appreciate that many of the elements described herein are functional entities that may be implemented as discrete or distributed components or in conjunction with other components, and in any suitable combination and location.

Still further, various functions described herein as being performed by one or more entities may be carried out by hardware, firmware, and/or software logic. For instance, various functions may be carried out by a processor (i.e., one or more processors) executing a set of machine language instructions stored in memory. Provided with the present disclosure, those skilled in the art can readily prepare appropriate computer instructions to perform such functions.

2. Exemplary Operation

Figure 4:
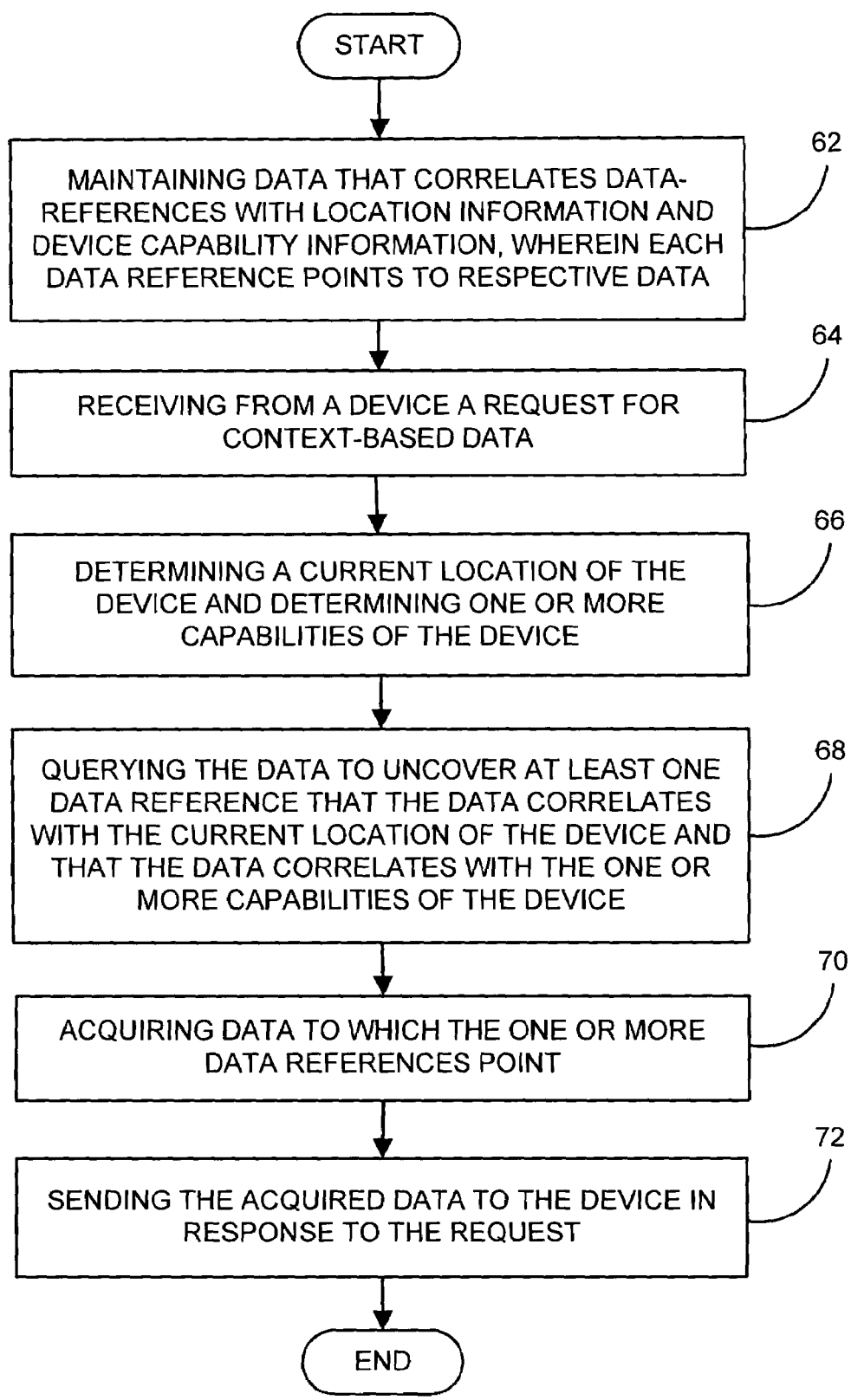
FIG. 4 is a flowchart illustrating a process carried out by a system in accordance with an exemplary embodiment.

FIG. 4 is a flowchart that depicts functions that might be involved in providing context-based information to a client station 8 in communication with the wireless telecommunications network 10 of FIG. 1.

At step 62 of FIG. 4, an entity, such as the DSD 34, can maintain a set of data that correlates one or more data references with other information, such as location information and client station capability information. The DSD 34 can maintain such data sets in the DSD database 36, for example.

In an exemplary embodiment, each data reference can point to respective data. An exemplary data reference might comprise a URI, such as a URL. The URI can then point to data, such as files or Web pages, and can retrieve the data when invoked.

In an exemplary embodiment, the DSD 34, or another suitable entity, can correlate the data references with other information, such as location information and client station capabilities. FIGS. 5-8 depict an exemplary way to correlate data references with other information using the concept of Cartesian products. Other examples are possible as well.

By way of example, the table of FIG. 5 defines four representations of data information, each of which comprises (in the form of three fields) data reference, data size, and data provider attributes. As shown in the exemplary table of FIG. 5, the data reference attribute can comprise, for example, a URI pointing to the data; the data size attribute can comprise, for example, the size of the data; and the data provider attribute can comprise, for example, the name of the service provider providing the data. Other examples are possible as well.

By way of example, the table of FIG. 6 defines two representations of device information, each of which comprises (in the form of one field) a device requirement attribute. As shown in the exemplary table of FIG. 6, the device requirement attribute can comprise, for example, a capability that a client station 8 must have to properly receive and/or output particular data. Other examples are possible as well.

By way of example, the table of FIG. 7 defines two representations of location information, each of which comprises (in the form of one field) a location attribute. As shown in the exemplary table of FIG. 7, the location attribute can comprise, for example, an equation requiring the geographical coordinates (x, y, z) of the client station 8 to be within a certain range. In other embodiments, the location attribute can comprise specific geographical coordinates (x, y, z). Other examples are possible as well.

In an exemplary embodiment, an entity, such as the DSD 34, might combine information in different tables or directories using Cartesian products. The table of FIG. 8 depicts the full Cartesian product of the data information of FIG. 5, the device information of FIG. 6, and the location information of FIG. 7. The Cartesian product refers to the product set that comprises all possible combinations of one attribute from each representation of information. In an exemplary embodiment, each representation of information can come from one or more service providers and/or come from one or more directories (such as a data information directory, a device information directory, and a location information directory, for example).

Thus, the data set depicted in the table of FIG. 8 can represent the requirements for delivering information to a certain client station 8 based on the client station's location. Specifically, the data set depicted in the table of FIG. 8 can correlate data references to any client station 8 with a client station capability that matches any capability on record in any of the known locations. An entity in the wireless network 10 can then query that information to respond to a request for information from a client station 8.

Turning back to FIG. 4, at step 64, the wireless telecommunications network 10 might receive from a client station 8 a request for context-based data. The request might be in the form of an HTTP request carrying a "context URL," i.e., a special URL that the carrier understands to be a request for context-based data, although other examples are possible as well. Entities of the wireless telecommunications network 10, such as the BTS 14 and BSC 16, might transmit the request for context-based information to the MSC 18, and the MSC 18 might then pass the request to the MPC 32. In an exemplary embodiment, the request might comprise information on the location of the client station 8, the NAI of the client station 8, and/or a service identifier, which might identify, for example, a service provider and/or the service requested.

At step 66 of FIG. 4, an entity, such as the MPC 32 or the DSD 34, can determine a current location and one or more capabilities of the client station 8 in response to the request for context-based information. In an exemplary embodiment, the DSD 34 can receive the NAI of the client station 8 and can use the NAI to query the LOC 40 for the location of the client station 8. For example, the LOC 40 and the LOC database 42 might maintain a look-up table of client station locations, which might correlate NAIs with associated location information. Likewise, in an exemplary embodiment, the DSD 34 can use the NAI of the client station 8 to query the CSC 44 for the capabilities of the client station 8. And the CSC 44 and the CSC database 46 might maintain a look-up table of client station capabilities, which might correlate NAIs with associated capability information. Other examples are possible as well.

In another embodiment, client station capabilities might correlate with the make and/or model of the requesting client station 8. In such an embodiment, one or more entities, such as the CSC 44 and the CSC database 46, might maintain a look-up table of make and/or model information correlated with associated capability information. Upon sending a request for context-based information, a client station 8 might also send identification information that might identify its make and/or model. For example, the client station 8 might send an ESN (electronic serial number) of the client station 8, which might have been programmed into the client station 8 when it was manufactured; an MIN (mobile identification number) of the client station 8, which might have been programmed into the client station 8 upon purchase; and/or an SID (system identification code) or a verification of a SID, which might correspond with a particular carrier and which might have been programmed into the client station 8 upon purchase. Other examples are possible as well.

At step 68 of FIG. 4, once the location and capabilities of the client station 8 are returned to the querying entity, the querying entity can query one or more databases for relevant information. Information might be relevant if it corresponds to the location of the client station 8, the capabilities of the client station 8, and the service provider identified by the client station 8 (in the service identifier, for example). Relevant information might comprise data references, such as URIs, that can point to data, such as files or Web pages, for example. Thus, in an exemplary embodiment, an entity, such as the DSD 34, can then filter available information to create a subset of information that contains only the relevant information (i.e., data references to relevant data).

The table of FIG. 9 depicts an exemplary subset of the full Cartesian product of the table of FIG. 8. An exemplary subset might only include information that comprised particular attributes or met certain limitations. For example, the table of FIG. 9 includes an exemplary representation of information that might result if the location (x, y, z) of the client station 8 is limited to the range of locations in which the equation $(x+1)^2+(y+1)^2+(z+1)^2=1$, and if the provider of the information is limited to provider2. The exemplary table of FIG. 9 thus represents the requirements for delivering information, such as the URI www.provider1.com/picture1.gif or www.provider1.com/picture2.gif to a client station 8 at a certain location and with certain capabilities. In the exemplary table of FIG. 9, the data represented by www.provider1.com/picture1.gif and www.provider1.com/picture2.gif can only be sent to a client station 8 with a color display screen and 16 MB of memory. Other examples are possible as well.

Information can be limited in any of a number of different ways. As discussed above, an entity, such as the DSD 34, can determine a current location and one or more capabilities of the client station 8 using the NAI of the client station 8 to query other entities. In an exemplary embodiment, a user of the client station 8, in turn, might limit a request for information as well. For example, a user of the client station 8 might use the keypad 142 of the client station 8 to interact with the context-enabled browser application 132 of the client station 8. The user might then use the keypad 142 to limit data to only those files or Web pages from, for example, a particular provider, such as provider2. Other examples are possible as well.

Further, content limitations might also be pre-selected by a user, learned by the client station 8 as preferences, and/or subscribed to by the user, for example. In an exemplary embodiment, a user might subscribe to content from content provider2 but not content from content provider1. Thus, the entity filtering information might create a subset of information limited to information, or data references, from provider2. Other examples are possible as well.

At step 70 of FIG. 4, an entity, such as the DSD 34, can retrieve data to which the data references obtained in step 68 point. In an exemplary embodiment, the DSD 34 can send one or more requests for information to the service providers identified in the relevant data references. The requests for information might include an identification of the client station 8 that requested the data. In such a case, the DSD 34 might maintain a record (in the DSD database 36, for example) of requests made correlated with the identifications of client stations making those requests. The DSD 34 might send the requests over a packet-switched network 24, such as the Internet. And the requests might be in the form of an HTTP request. Other examples are possible as well.

Each service provider might then send a response to the request to the DSD 34. The service providers might send the response over a packet-switched network 24, such as the Internet for example. The DSD 34 can then receive the response and determine the appropriate client station to which to send the context-based content.

At step 72 of FIG. 4, upon receiving a response from the invoked data reference, an entity, such as the DSD 34, might transfer the returned information to the MSC 18 for forwarding to the client station 8. The returned information might be in the form of an HTTP response, for example. The client station 8 might then receive the context-based content via its context-enabled browser application 132. In an exemplary embodiment, the media application 134 (or another application 146) of the client station 8 might then present the content to a user via one or more output components 130, such as the display screen 138 and/or the audio speaker 140.

3. Conclusion

Several exemplary embodiments of the present invention have been described above. Those skilled in the art will understand, however, that changes and modifications may be made to these embodiments without departing from the true scope and spirit of the present invention, which is defined by the claims.

I claim:

1. A method comprising:
   maintaining a set of data comprising a plurality of records, wherein each record includes at least the following fields: (i) a data reference comprising a uniform resource identifier (URI), (ii) location information, and (iii) device capability information, such that each data reference is correlated with both location information and device capability information, and wherein each data reference points to respective data;
   receiving from a device a request for context-based data;
   determining a current location of the device and determining one or more capabilities of the device;
   querying the set of data to uncover at least one data-reference (comprising a URI) that the set of data correlates with both (i) the current location of the device and (ii) the one or more capabilities of the device;
   acquiring data to which the at least one data-reference points; and
   sending the acquired data to the device in response to the request; and
   wherein the device comprises a mobile station.

2. The method of claim 1, further comprising:
   a wireless carrier performing the method.

3. The method of claim 1, wherein receiving the request comprises receiving the request via a radio frequency air interface, and wherein sending the acquired data comprises sending the acquired data via the radio frequency air interface.

4. The method of claim 1, wherein the request comprises an HTTP request.

5. The method of claim 1, wherein determining the current location of the device comprises querying a location-determination system.

6. The method of claim 1, wherein determining the current location of the device comprises reading an indication of the current location from the request.

7. The method of claim 1, wherein determining the one or more capabilities of the device comprises querying a device capabilities store to determine the one or more capabilities of the device.

8. The method of claim 1, wherein determining the one or more capabilities of the device comprises determining a make and model of the device, wherein the make and model inherently defines certain device capabilities.

9. The method of claim 1, wherein acquiring data to which the at least one data-reference points comprises sending at least one HTTP request directed to at least one URI of the at least one data-reference.

10. The method of claim 1, further comprising:
    generating the set of data by a process comprising computing at least one Cartesian product of (i) a measure of geographic location and (ii) one of the data references.

11. A context-based data delivery system comprising:
    a set of data comprising a plurality of records, wherein each record includes at least the following fields: (i) a data reference comprising a uniform resource identifier (URI), (ii) location information, and (iii) device capability information, such that each data reference is correlated with both location information and device capability information, and wherein each data reference points to respective data;
    a network server having a network interface through which the server receives a request from a device for context-based data and through which the server sends a response to the request; and
    wherein the network server is programmed to respond to the request by (i) determining a current location of the device and determining one or more capabilities of the device, (ii) querying the set of data to uncover at least one data-reference (comprising a URI) that the set of data correlates with both (1) the current location of the device and (2) the one or more capabilities of the device, (iii) acquiring data to which the at least one data-reference points and (iv) sending the acquired data via the network interface to the device as the response to the request; and wherein the device comprises a mobile station.

12. The context-based data delivery system of claim 11, further comprising a radio access network through which the request passes from the device to the network server, and through which the acquired data passes from the network server to the device.

13. The context-based data delivery system of claim 11, wherein the request is embodied in an HTTP request message, and the response is embodied in an HTTP response message.

14. The context-based data delivery system of claim 11, further comprising a location-determination system, wherein the network server determines the current location of the device by querying the location-determination system.

15. The context-based data delivery system of claim 11, further comprising a device capabilities store, wherein the network server determines the one or more capabilities of the device by querying the device capabilities store.

16. The context-based data delivery system of claim 11, wherein the network server acquires data to which the at least one data-reference points by sending at least one HTTP request directed to at least one URI of the at least one data-reference.

17. The context-based data delivery system of claim 11, wherein the network server comprises a portal server.

18. The context-based data delivery system of claim 11, wherein the network server is operated by a carrier that provides the device with an access channel.

* * * * *